(12) United States Patent
DeVries et al.

(10) Patent No.: US 6,239,899 B1
(45) Date of Patent: May 29, 2001

(54) MIRROR WITH INTERNAL SUPPORT PLATE

(75) Inventors: Timothy S. DeVries, Jenison; Gregory M. Ejsmont, Grand Rapids, both of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/464,049

(22) Filed: Dec. 15, 1999

(51) Int. Cl.$^7$ ................ G02F 1/153; G02B 5/08

(52) U.S. Cl. ........................... 359/267; 359/608

(58) Field of Search ................ 359/265–275, 359/608

(56) References Cited

U.S. PATENT DOCUMENTS

| | | | |
|---|---|---|---|
| 5,671,996 | 9/1997 | Bos et al. | 362/83.1 |
| 5,940,201 | * 8/1999 | Ash et al. | 359/267 |
| 6,170,956 | * 1/2001 | Rumsey et al. | 359/839 |

OTHER PUBLICATIONS

Exhibit B: Official Journal of the European Communities—Council of European Communities—71/721/EEC relating to the rear–view mirrors of motor vehicles; dated Mar. 22, 1971.
Exhibit C: 79/795/EEC—Sep. 22, 1979; No. L239/6, L239/7; Official Journal of the European Communities.
Exhibit D: 85/205/EEC; Official Journal of the European Communities, Mar. 29, 1985; No. L90/9, L90/10, L90/11.

* cited by examiner

Primary Examiner—Georgia Epps
Assistant Examiner—John Magee
(74) Attorney, Agent, or Firm—Brian J. Rees; Price Heneveld Cooper Dewitt & Litton

(57) ABSTRACT

A mirror assembly for a vehicle includes a housing defining a cavity and a front opening, and an electrochromic mirror subassembly supported in the front opening. A support plate is supported by the housing in the cavity, and a printed circuit board is supported behind the support plate. The support plate includes a front surface located proximate but spaced rearward of a rear surface of the mirror subassembly to form a thin gap of about 0.3 mm to 1.0 mm, and preferably of about 0.5 mm, therebetween. The support plate covers at least about 50%, and preferably about 80%, of glass elements in the mirror subassembly. The support plate includes forwardly-oriented biasing fingers shaped to press on a back perimeter of the mirror subassembly to maintain the gap without distorting the mirror subassembly. The support plate permits flexure of the mirror subassembly into the thin gap, but prevents excessive deformation of the mirror subassembly, thus reducing a tendency of the mirror subassembly to fracture. The support plate also includes rearwardly-oriented biasing fingers shaped to maintain compression on the printed circuit board to prevent rattling and looseness. The printed circuit board includes a control circuit operably connected to the electrochromic mirror subassembly and electrical components mounted on the circuit board, with the electrical components being visibly positioned in the front.

27 Claims, 3 Drawing Sheets

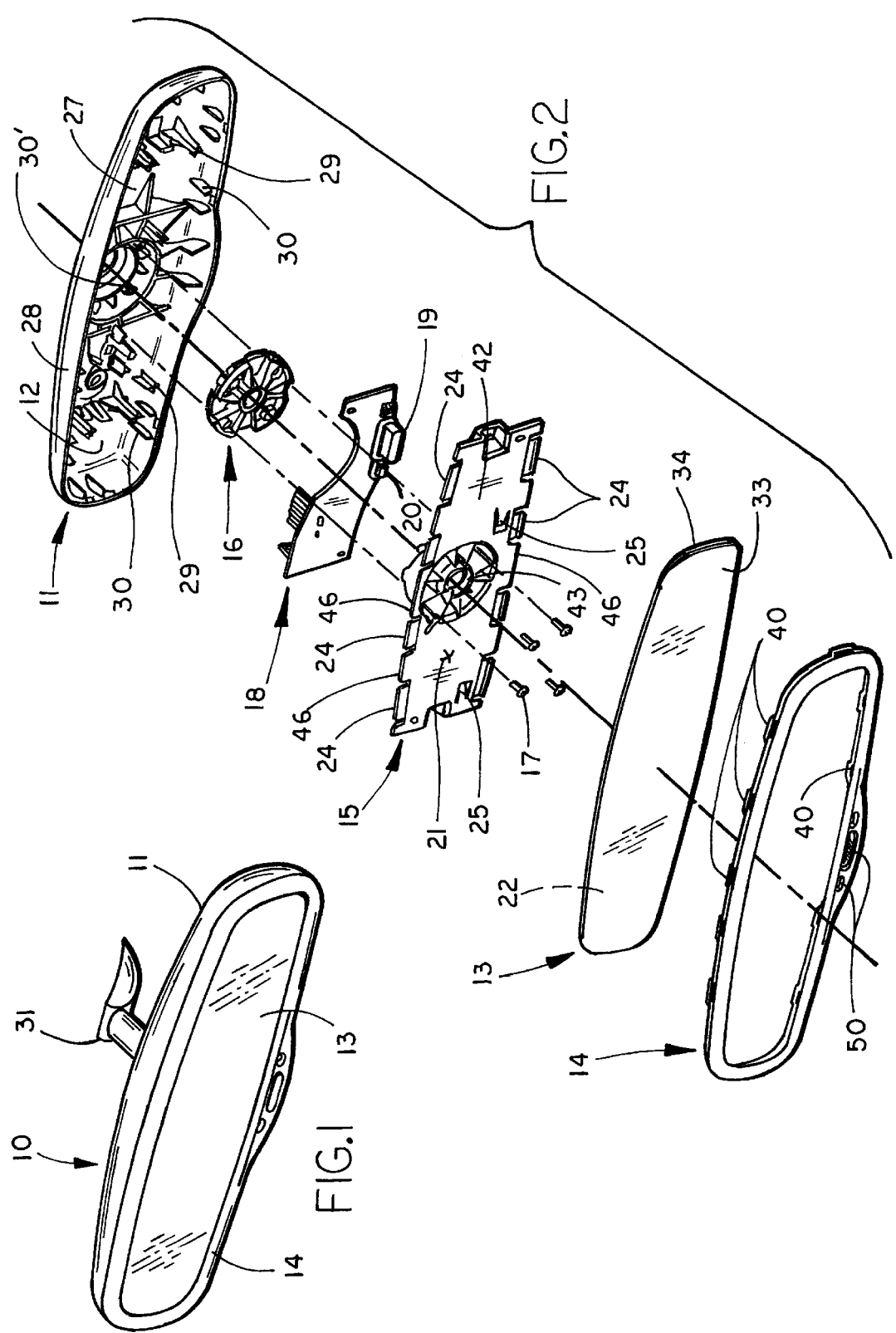

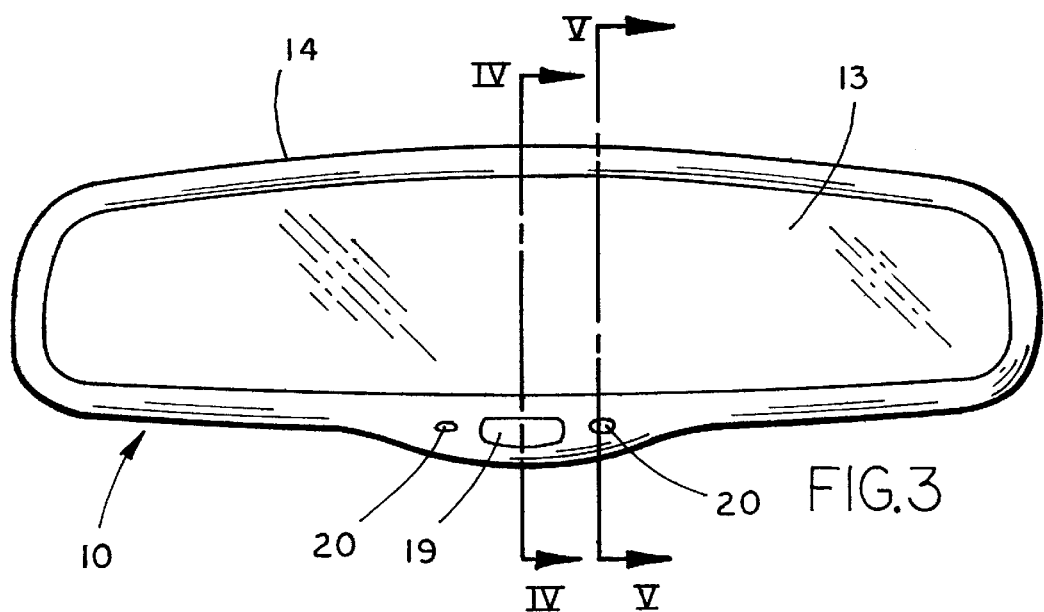
FIG. 3
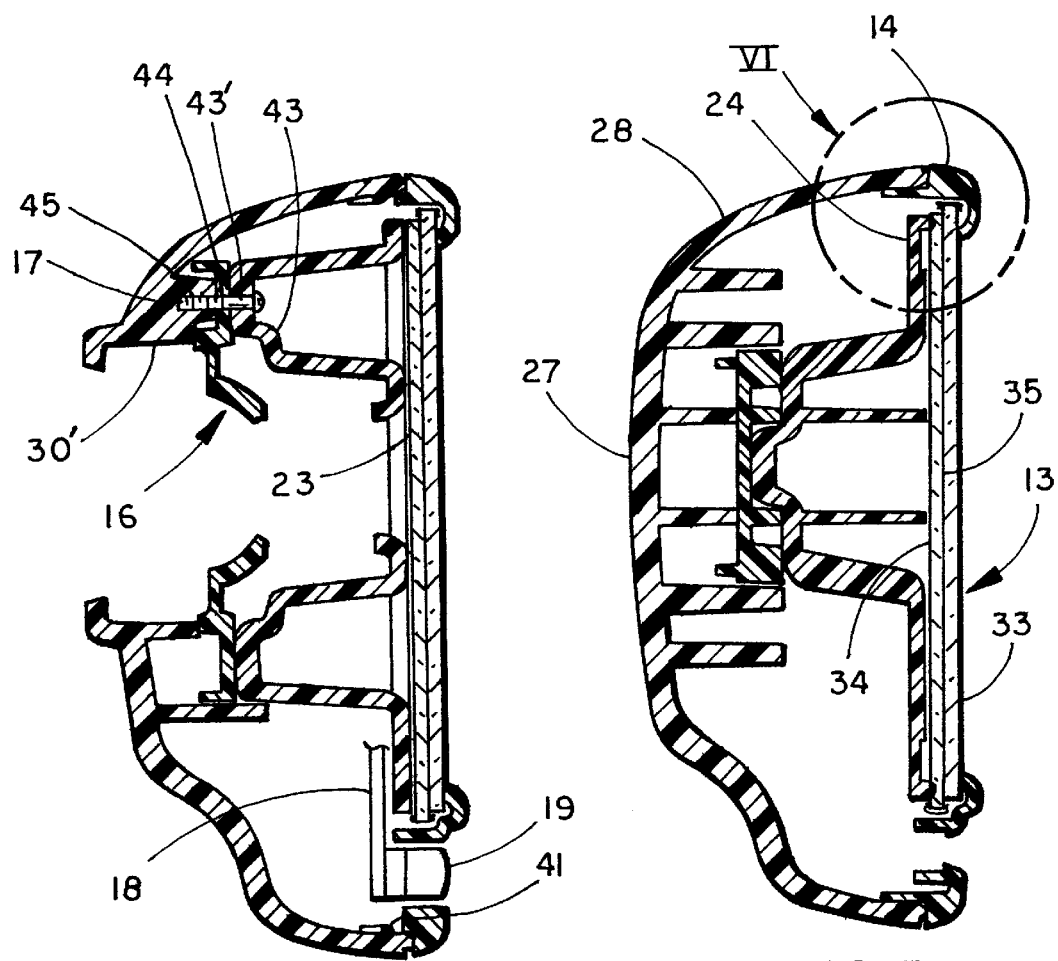
FIG. 4
FIG. 5

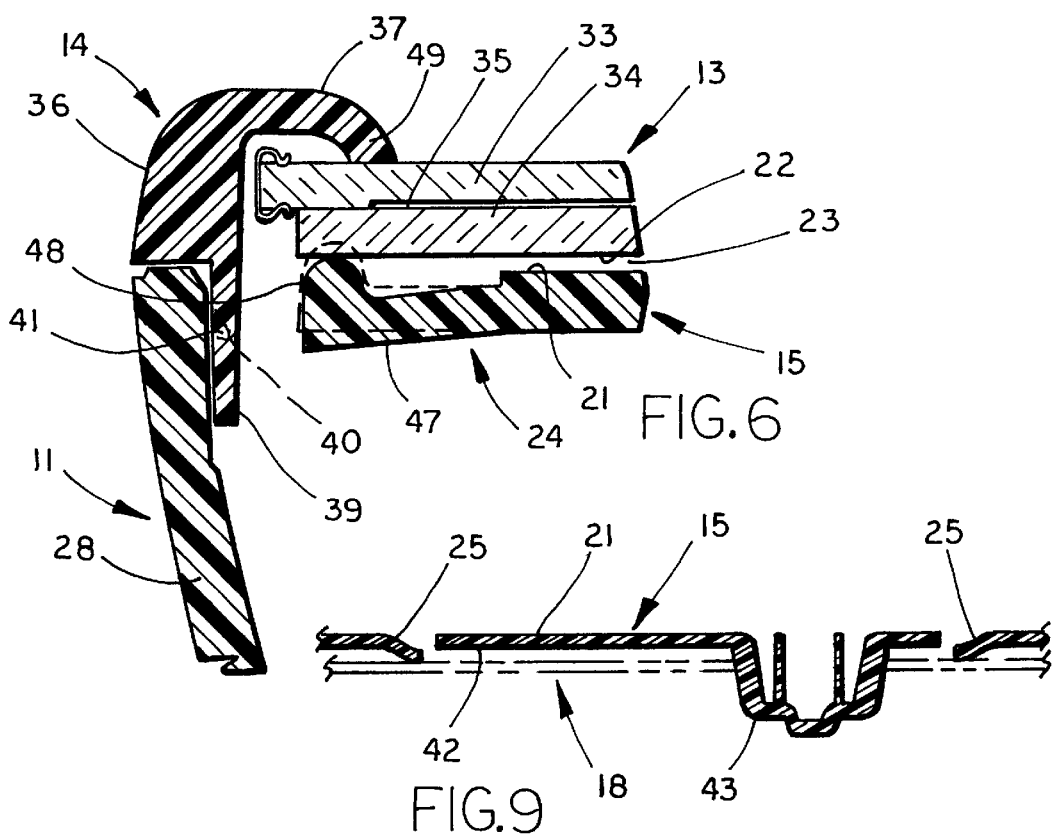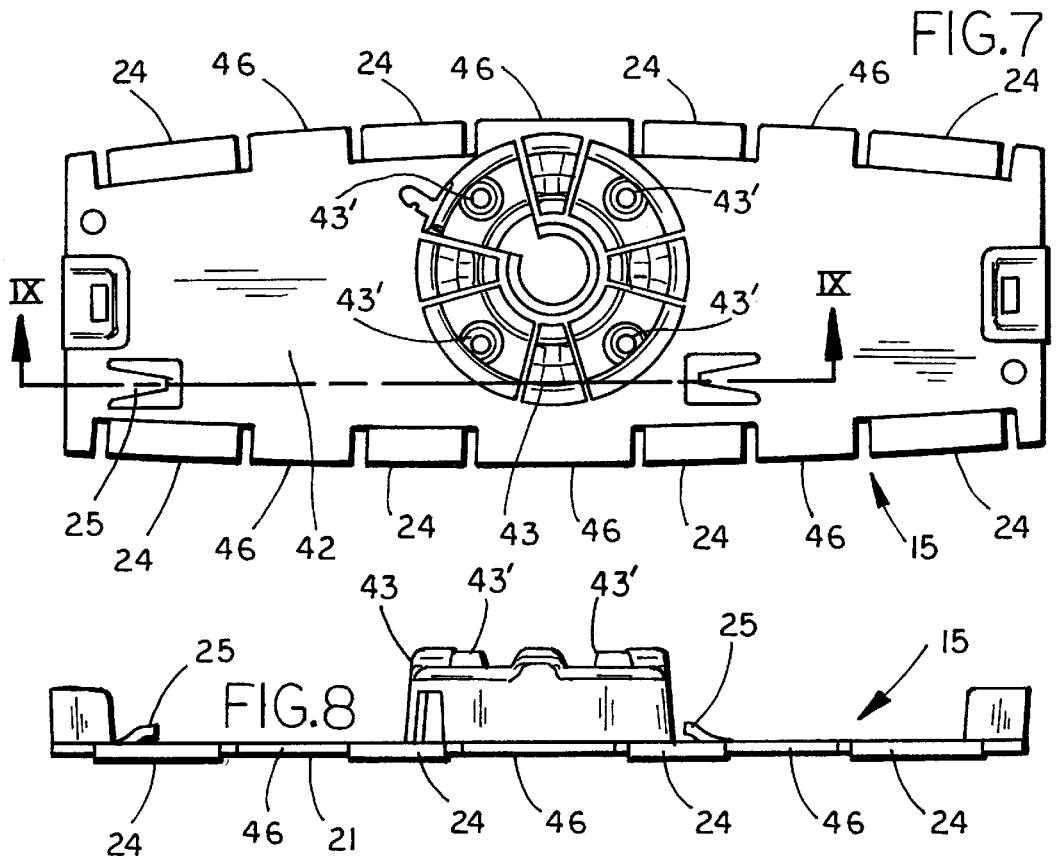

MIRROR WITH INTERNAL SUPPORT PLATE

BACKGROUND OF THE INVENTION

The present invention relates to mirrors, and more particularly relates to an electrochromic mirror for passenger vehicles having an electrochromic mirror subassembly with thin glass elements that save weight, but are potentially so thin that they require support to prevent undesired breakage, provide adequate impact strength, and to prevent unacceptable flexure resulting in image distortion.

Electrochromic mirrors have gained wide acceptance in modern passenger vehicles due to their ability to darken as a way of reducing glare from other vehicle headlights. Typically, electrochromic mirrors include a pair of glass elements with electrochromic material therebetween that can be darkened to reduce the brightness of light reflected from a reflector material associated with the rear glass element. Usually, the glass elements are each at least about 2.2 mm thick so that the glass elements have sufficient internal structure to be self-supporting and resistant to flexure that would unacceptably distort the glass elements and result in distorted reflected images. Glass elements that are thinner than 2.2 mm traditionally are so thin that they may unacceptably deform, crack, or break. This can occur as a result of many different factors, such as from a person cleaning or pressing on the front glass element, or from impact during a vehicle crash, or from stresses generated within the mirror itself. Such stress can come from assembly, from non-uniform thermal expansion of components in the mirror, or from non-uniform support of the glass elements.

Despite the problems associated with thin glass elements, thin glass is very desirable because it results in significant mass reduction in mirror assemblies, which in turn, results in reduced mirror vibration and hence improved mirror function. Specifically, reduced mirror mass contributes directly to a reduction in a condition sometimes referred to as a "pendulum effect" which results in mirror vibration. The "pendulum effect" is caused by a mirror assembly having a mass supported in cantilever off of a vehicle front windshield. The vibration of the mirror increases as the mass of the mirror increases and as a length of the cantilever arm increases. The glass elements are good candidates for mass reduction because two glass elements are used and further, both are located at a front of the mirror assembly, at a point farthest from the vehicle front windshield where the cantilever arm is the greatest. In regard to vehicle weight, it is noted that vehicle manufacturers are extremely interested in reducing vehicle weight, even in small amounts. A reason for this is because reduced vehicle weight has several benefits, including improved vehicle gas mileage, improved/reduced emissions, more favorable government standards for emissions (i.e. heavier vehicles face more stringent government standards), and reduced cost associated with less material usage.

One specific problem with glass elements having reduced thickness concerns impact testing. Vehicle mirrors must pass a vehicle impact test to assure that they are durable and also to assure that they will not contribute unacceptably to flying debris during a vehicle crash. Glass elements made from existing technologies that have a thickness of less than 2.2 mm do not have sufficient strength to pass existing impact test requirements by vehicle manufacturers unless the mirror subassembly is somehow supported on its back surface or the mirror subassembly is reinforced. However, it is very difficult on a production basis to consistently provide a perfectly flat surface that non-distortingly engages and supports such thin glass elements. Also, it is difficult to provide a non-distorting reinforcement since non-uniform stresses unavoidably occur during assembly and while the mirror assembly is in service. At the same time, in conflict with the above, it is desirable to support the thin glass elements in a manner that communicates stress from the impact test against the glass elements directly back to the mirror mounting structure. If possible, this would allow the mirror mounting structure to communicate the impact stress directly to the front windshield which supports it.

Various electrochromic (EC) mirror constructions are known having features that affect impact strength and impact test results. For example, it is known to adhere foam to a rear surface of a rear glass element of an EC mirror subassembly, and to adhere a circuit board or other support structure to the foam. (See Bos U.S. Pat. No. 5,671,996.) It is known to engage a rear surface of a rear glass element of an EC mirror subassembly with rubber bumpers or metal springs or plastic springs. (See Tokai Rika prior art.) It is also known to bond front and rear glass elements together with solid-state phase electrochromic material, such that the front and rear glass elements combine to, in effect, form a single beam or plate of glass. (See Tokai Rika prior art.) However, each of the known arrangements have unwanted functional limitations or provide non-uniform support with high stress areas or "hot spots" that potentially cause unwanted deformation or distortion of thin glass elements in the range of 1.6 mm to 1.1 mm thickness or even lower. Further, no known arrangement provides a uniform non-distorting support against impact breakage across substantially an entire EC mirror subassembly, where the EC mirror subassembly uses unbonded front and rear glass elements that are 1.1 mm to 1.6 mm thick, and that are separated by a solution-phase, or liquid phase gel-type or hybrid EC material therebetween such that the thin glass elements do not directly reinforce each other.

Accordingly, a mirror assembly is desired that solves the aforementioned disadvantages and that has the aforementioned advantages.

SUMMARY OF THE PRESENT INVENTION

In one aspect of the present invention, a mirror assembly for a vehicle includes a housing defining a cavity and a front opening, and an electrochromic mirror subassembly supported in the front opening. A support plate is supported by the housing in the cavity. The support plate includes a front surface extending over at least 50% of a rear surface of the electrochromic mirror subassembly and that is located proximate but spaced rearward of a rear surface of the mirror subassembly to form a thin gap therebetween. The gap permits limited flexure of the mirror subassembly, but the support plate prevents excessive deformation of the mirror subassembly, thus reducing a tendency of the mirror subassembly to fracture.

In another aspect of the present invention, a mirror assembly includes a housing defining a cavity and a front opening, an electrochromic mirror subassembly supported in the front opening, and a support plate supported by the housing in the cavity. The support plate includes a front surface located proximate but not attached to a rear surface of the mirror subassembly. The support plate also includes flexible sections that permit limited flexure of the mirror subassembly. The front surface is configured and arranged to abut the mirror subassembly on impact to prevent excessive deformation of the mirror subassembly, thus reducing a tendency of the mirror subassembly to fracture.

In yet another aspect, a mirror assembly includes a housing defining a cavity and a front opening, and an electrochromic mirror subassembly supported in the front opening. The electrochromic mirror subassembly includes front and rear glass elements and includes a solution-phase electrochromic material therebetween. The front and rear glass elements are less than about 1.6 mm thick. A support plate is supported by the housing in the cavity. The support plate includes a front surface located proximate but spaced rearward of a rear surface of the mirror subassembly to form a thin gap of about 0.3 mm to 1.0 mm deep therebetween. The gap permits flexure of the mirror subassembly, but the support plate prevents excessive deformation of the mirror subassembly upon impact or localized stress, thus reducing a tendency of the mirror subassembly to fracture.

In yet another aspect, a mirror assembly includes a housing defining a cavity and a front opening, an electrochromic mirror subassembly supported in the front opening, and a bezel attached to a front edge of the housing around the front opening. The bezel includes a flange abutting a front perimeter surface of the mirror subassembly. A support plate is supported by the housing in the cavity. The support plate includes a plurality of edge fingers engaging a perimeter edge of the mirror subassembly and biasing the mirror subassembly against the flange of the bezel.

In yet another aspect, a mirror assembly includes a housing defining a cavity and a front opening, and an electrochromic mirror subassembly supported in the front opening. A printed circuit board is securely supported in the housing in the cavity. A support plate is also supported by the housing in the cavity. The support plate includes a plurality of fingers engaging the printed circuit board and biasingly holding at least a portion of the printed circuit in compression within the housing.

In yet another aspect, a mirror assembly includes a housing including a back wall, an electrochromic mirror subassembly supported in the front opening and a support plate supported by the back wall. The support plate includes a flat front surface unattached to but positioned closely behind the mirror subassembly in a position where the flat front surface supports the mirror subassembly upon impact. The support plate is shaped to prevent excessive flexure of the mirror subassembly, thus reducing a tendency of the mirror subassembly to fracture when non-uniformly stressed.

The present invention provides a mirror construction having a surprising and unexpected impact resistance along with reduced weight.

These and other features, advantages, and objects of the present invention will be further understood and appreciated by those skilled in the art by reference to the following specification, claims, and appended drawings.

BRIEF DESCRIPTION OF DRAWINGS

FIG. 1 is a perspective view of a mirror assembly embodying the present invention;

FIG. 2 is an exploded perspective view of the mirror assembly shown in FIG. 1;

FIG. 3 is a front view of the mirror assembly shown in FIG. 1;

FIGS. 4–5 are cross-sections taken along the lines IV—IV and V—V in FIG. 3;

FIG. 6 is an enlarged view of the circled area VI in FIG. 5;

FIGS. 7–8 are front and edge views of the support plate shown in FIG. 2; and

FIG. 9 is a cross section taken along the line IX—IX in FIG. 7.

DETAILED DESCRIPTION OF THE PREFERRED EMBODIMENT

A mirror assembly 10 (FIGS. 1–2) for a passenger vehicle includes a housing 11 defining a cavity 12 and a front opening, and includes an electrochromic mirror subassembly 13 supported in the front opening and secured thereto by a perimeter bezel 14. Mirror assembly 10 is an interior mirror, but it is contemplated that the present invention and inventive arrangement can also be used in exterior mirror assemblies. A support plate 15 and a socket-defining member 16 are attached to a back wall of the housing 11 in the cavity 12 by screws 17. A printed circuit board 18 is supported against a back of the support plate 15, and includes electrical components in the form of a switch 19 and LED displays 20 that are positioned in a lower part of the front opening for viewing by a vehicle driver. The support plate 15 includes a front surface 21 located proximate but spaced rearward of a rear surface 22 of the mirror subassembly 13 to form a thin gap 23 of about 0.3 mm to 1.0 mm therebetween (FIG. 6). The support plate 15 (FIG. 2) includes forwardly-oriented biasing fingers 24 shaped to press on a back perimeter of the mirror subassembly 13, biasing the mirror subassembly 13 against the bezel 14 in a manner that maintains the gap 23 without distorting the mirror subassembly 13. The support plate 15 permits flexure of the mirror subassembly 13 into the thin gap 23, but prevents excessive deformation of the mirror subassembly 13, thus reducing a tendency of the mirror subassembly 13 to fracture. The support plate 15 also includes rearwardly-oriented biasing fingers 25 shaped to maintain compression on the printed circuit board 18 to prevent rattling and looseness.

The housing 11 (FIG. 2) is horizontally elongated and is shaped for positioning in an interior passenger compartment of a vehicle. However, it is noted that the housing could also be less elongated, such that it would be useable in exterior vehicle applications. The illustrated housing 11 includes a back wall 27 and a sidewall 28 that define the cavity 12. A front edge of the sidewall 28 defines the front opening of the housing. The housing 11 includes various bosses 29 and reinforcement ribs 30 to provide structure and support to components within the housing 11. A center mounting section 30' on the back wall 27 is configured to mate with and stably support the socket-defining member 16. The socket-defining member 16 is configured to frictionally engage a ball (not specifically shown) on the mirror mount 31, to provide an adjustable ball-and-socket joint. Mirror mounts for mounting to a vehicle front windshield are generally known in the art, and need not be described here for an understanding of the present invention.

Electrochromic (EC) mirror subassemblies are also known in the art, and a detailed explanation of them beyond that given below is not necessary to a person of ordinary skill in this art for an understanding of the present invention. The electrochromic (EC) mirror subassembly 13 (FIG. 5) includes a front glass element 33 and a rear glass element 34. An electrochromic (EC) material 35 is positioned between the glass elements 33 and 34. A reflector material is located on either the front surface or the rear surface of the rear glass element 34, depending upon the type of the mirror subassembly.

The present EC material 35 is a solution phase (sometimes called herein a "liquid-phase" or "gel-type") EC material, as disclosed in U.S. Pat. No. 4,902,108, entitled "SINGLE-COMPARTMENT, SELF-ERASING, SOLUTION-PHASE ELECTROCHROMIC DEVICES, SOLUTIONS FOR USE THEREIN, AND USES THEREOF," issued Feb. 20, 1990, to H. J. Byker; and U.S. Pat. No. 5,278,693, entitled "TINTED SOLUTION-PHASE ELECTROCHROMIC MIRRORS," issued Jan. 11, 1994, to D. A. Theiste et al., the entire contents of both of which are incorporated herein. In addition, a hybrid system where part of the electrochromic medium is solid-state and part is solution phase could also benefit from the support plat of the present invention. A detailed description of solution phase or hybrid EC material is not required to understand the present application. It is sufficient to understand that solution-phase materials, because of their liquidic or flowable properties, do not rigidly bond the front and rear glass elements 33 and 34 together like a completely solid-state EC medium. As a result, the stiffness of an EC mirror subassembly (13) using 1.1 mm thick glass elements (33 and 34) and a solution-phase EC material (35) is dramatically weaker and more flexible than an EC mirror subassembly having 1.1 mm thick glass elements and a solid-state phase EC material. This is because in the EC mirror subassembly with solid-state phase EC material, the thick glass elements are bonded together in a manner that causes them to bend much like a single glass element having their total thickness. Contrastingly, the EC mirror subassembly with the solution phase EC material bends in a complex manner where the thin glass elements bend simultaneously but independently and separately and where the solution phase EC material ebbs and flows somewhat in reaction to the stress. The net result is that the mirror subassembly with solution phase EC material tends to be substantially weaker and more flexible and concurrently more sensitive to impact than the mirror subassembly with solid-state phase EC material, even where the front and rear glass elements have the same thickness and other properties.

The present glass elements 33 and 34 are less than 2.2 mm, or preferably less than about 1.6 mm down to about 1.1 mm. The mirror subassembly 13 forms a unit that is self-supporting in a planar condition, but that is susceptible to unacceptable flexure and/or breakage during impact. Also, at least where the electrochromic material 35 is a gel or includes a liquidic component, the front and rear glass elements 33 and 34 individually and especially the front glass element 34 are subject to deflection and/or breakage. A more detailed description of EC mirror subassemblies having glass elements of 1.1 mm can be found in a co-assigned application Ser. No. 09/270,153, filed Mar. 16, 1999, entitled "LIGHT-WEIGHT ELECTROCHROMIC MIRROR", the entire contents of which are incorporated herein by reference.

The perimeter bezel 14 (FIG. 2) defines a loop and includes a cross-section having a structural body portion 36 (FIG. 6), an aesthetic looping front flange 37 that extends onto and abuts a front surface of the front glass element 33, and a trailing attachment flange 39. The attachment flange 39 is shaped to fit inside the front edge of the sidewall 28. The attachment flange 39 includes apertures 40 arranged to frictionally snappingly engage hooks 41 inside the front edge of the sidewall 28. By this arrangement, the mirror subassembly 13 is retained by the perimeter bezel 14 inside the housing 11.

The support plate 15 (FIG. 2) is a molded component that includes an enlarged planar body 42 in a preferred form that has a flat front surface that preferably extends over at least about 50% of the glass elements 33 and 34, but as illustrated, extends over about 80% of the area of the glass elements 33 and 34.

Notably, it is contemplated that a scope of the present invention includes a circumstance where the illustrated flat front surface is replaced with a matrix of flat-topped ribs, as long as the ribs are sufficiently dense and across the entire support plate 15 sufficiently to be equivalent to the flat surface for purposes of passing an impact test. A center structure 43 is molded in the planar body 42, and is configured to matingly engage the socket-defining member 16. Apertured bosses or flanges 43' (FIG. 4) on the center structure 43 align with holes 44 in the socket-defining member 16 and with apertured bosses 45 in the center mounting section 30' on the housing 11. Several screws 17 extend through the center mounting section 30', through the holes 44 in the socket-defining member 16 and threadably into the apertured bosses 44 on the center structure 43 to clampingly secure the three components together in a sandwich-like arrangement.

The support plate 15 (FIG. 2) includes a perimeter having several radial slots therein. The slots define, in alternating sequence, forwardly-facing leaf-spring-like fingers 24 and flat tabs 46. The forwardly-facing fingers 24 (FIG. 6) include a resilient leg 47 that extends coplanar with the body 42, and further include a forwardly protrusion 48 shaped to abut a back edge of the mirror subassembly 13. The protrusions 48 extend a significant length along the perimeter of the support plate 15, such as about 2 cm each, and at least about 25% and, as illustrated, about 40% of the total perimeter, such that the protrusions 48 distribute stress to the mirror subassembly 13 along a line segment of contact and not at a point contact. Further, the protrusions 48 are located substantially in-line with the contacting edge 49 of the bezel flange 37 but slightly outboard of the contacting edge 49. This arrangement provides a stress pattern that flows substantially perpendicularly through the mirror subassembly 13 and that characteristically does not unacceptably torque or deform the glass elements 33 and 34 out of their respective planar shapes. The forward fingers 24 bias the mirror subassembly 13 away from the support plate 15, such that the gap 23 is maintained during normal operation of the mirror assembly 10. The force imparted by the forward fingers 24 may vary, but it is contemplated that they will provide a total force sufficient to securely hold the mirror subassembly 13 stably against the bezel 14.

The gap 23 will vary depending upon the material properties of the glass elements 33 and 34, the properties of the mirror subassembly 13, the properties of the fingers 24 and 25, the properties of the mirror assembly 10 in total, and the impact test and functional requirements of the vehicle manufacturer. In the illustrated arrangement, the gap 23 is preferably about 0.3 mm to 1.0 mm, and more preferably about 0.5 mm. This results in a mirror that passes an impact test presently specified by at least one automotive manufacturer. This impact test is referred to herein as the "Impact Tests for Rearview Mirrors of Motor Vehicles." An example of such a test incorporates the testing standards for the "European Document Research—Official Agents of the Office for Official Publications of the European Communities—Council of the European Communities 0 71/127/EEC—March 1971, and also 79/795/EEC—1979, and also 85/205/EEC—1985, relating to the rear-view mirrors of motor vehicles—Impact Test 2.4.2. and 4.2. By providing a co-extensive and flat support with a gap of 0.5 mm to a rear surface of the rear glass element 34, the success of passing Impact Tests for Rearview Mirrors of Motor Vehicles is greatly increased.

The printed circuit (PC) board 18 (FIG. 2) has an electrical control circuit thereon for controlling operation of the electrochromic mirror subassembly 13. The PC board 18 also has the electrical components in the form of the switch 19 and LED displays 20 that are connected to the control circuit. Such control circuits are well known in the art. The switch 19 and the LED lights 20 are positioned on the PC board so that they are located in the front opening of the housing 11 for viewing by a vehicle driver. (See FIGS. 1 and 4.) Specifically, the switch 19 and LED lights 20 fit matably into matchingly shaped apertures 50 in a lower center area on the bezel 14. The PC board 18 is supported by bosses and ribs in the housing 11. The two rearwardly-extending leaf-spring-like fingers 25 (FIG. 9) extend from the body 42 into resilient engagement with at least a portion of the PC board 18. This biases the PC board 18 against the housing 18 (FIG. 2), preventing rattling and assisting with retention of the PC board 18 in the housing 11.

It is noted that the illustrated PC board 18 could be held in position by screws that extend through holes in diagonally opposite corners of the PC board 18 (See FIG. 2), although this is not necessary due to fingers 25. The fingers 25 press on portions of the PC board 18 that are spaced away from a line connecting the holes. It is contemplated that fasteners other than screws could also be used if direct attachment is desired, such as double-sided tape. In the illustrated "no-fastener" arrangement, a locator or the like can be used to generally support or locate the PC board 18, and the fingers 25 can be used to provide forces necessary for retaining the PC board 18 in place.

In the foregoing description, those skilled in the art will readily appreciate that modifications may be made to the invention without departing from the concepts disclosed herein. For example, it is specifically contemplated that the present invention can be used in outside mirrors as well as the inside mirrors. Such modifications are to be considered as included in the following claims, unless these claims, by their language, expressly state otherwise.

The invention claimed is:

1. A mirror assembly for a vehicle comprising:

a housing defining a cavity and a front opening;

an electrochromic mirror subassembly supported in the front opening; and a support plate supported by the housing in the cavity, the support plate including a flat front surface extending over at least 50% of a rear surface of the electrochromic mirror subassembly and that is located proximate but spaced rearward of the rear surface of the mirror subassembly to form a uniform and continuous gap therebetween, the gap permitting limited flexure of the mirror subassembly, but the support plate preventing excessive deformation of the mirror subassembly, thus reducing a tendency of the mirror subassembly to fracture.

2. The mirror assembly defined in claim 1, wherein the front surface of the support plate extends over 80% of the rear surface of the electrochromic mirror subassembly.

3. The mirror assembly defined in claim 1, including a bezel attached to the housing and extending around the front opening, the bezel including flanges abutting a front of the mirror subassembly, and wherein the support plate includes resilient members located around a perimeter of the support plate that bias the mirror subassembly forwardly against the bezel.

4. The mirror assembly defined in claim 3, wherein the resilient members are leaf-spring-shaped fingers formed integrally with a body of the support plate, and wherein the fingers include end surfaces that extend parallel the perimeter and define at least about 25% of the perimeter.

5. The mirror assembly defined in claim 3, wherein the fingers extend radially from the body and have a width dimension along a perimeter of the body that is at least as great as a length dimension of the fingers.

6. The mirror assembly defined in claim 5, wherein the fingers are spaced apart by tabs that extend coplanar with the body of the support plate.

7. The mirror assembly defined in claim 4, including a printed circuit board positioned in the housing and that is operably connected to the electrochromic mirror subassembly, and wherein the support plate includes rearwardly extending fingers that bias the printed circuit board rearwardly against the housing.

8. The mirror assembly defined in claim 7, wherein the support plate is attached to a back wall of the housing at a central location on the back wall.

9. The mirror assembly defined in claim 8, including a socket-defining member positioned between the support plate and the back wall, and including fasteners securing the support plate, the socket-defining member and the support plate together as a unit.

10. The mirror assembly defined in claim 9, wherein the fasteners include screws that extend through the back wall and the socket-defining member threadably into the back wall.

11. The mirror assembly defined in claim 1, wherein the housing includes a center mount connected to the support plate and adapted for connection to a front windshield mount, and configured to communicate stress directly from the mirror subassembly through the support plate and the center mount to a windshield mount.

12. The mirror assembly defined in claim 11, including a socket-defining member attached to the center mount that is adapted to form a part of a ball and socket joint.

13. The mirror assembly defined in claim 1, wherein the mirror subassembly includes a front glass element and a rear glass element, and includes a solution-phase electrochromic material in a space between the front and rear glass elements.

14. The mirror assembly defined in claim 13, wherein at least one of the front and rear glass elements has a thickness of less than 1.6 mm.

15. The mirror assembly defined in claim 14, wherein the front and rear glass elements each have a thickness of less than 1.1 mm.

16. The mirror assembly defined in claim 1, wherein the gap is about 0.3 mm to 1.0 mm deep.

17. A mirror assembly for a vehicle comprising:

a housing defining a cavity and a front opening;

an electrochromic mirror subassembly supported in the front opening; and a support plate supported by the housing in the cavity, the support plate including a front surface located proximate but not attached to a rear surface of the mirror subassembly, the support plate including flexible sections that permit limited flexure of the mirror subassembly, but the front surface being configured and arranged to abut the mirror subassembly on impact to prevent excessive deformation of the mirror subassembly, thus reducing a tendency of the mirror subassembly to fracture.

18. The mirror assembly defined in claim 17, wherein the front surface of the support plate is uniformly smooth and flat and relatively continuous.

19. The mirror assembly defined in claim 17, wherein the front surface of the support plate is spaced from a rear surface of the mirror subassembly to form a gap therebetween.

20. A mirror assembly for a vehicle comprising:

a housing defining a cavity and a front opening;

an electrochromic mirror subassembly supported in the front opening, the electrochromic mirror subassembly including front and rear glass elements and including a solution phase electrochromic material therebetween, the front and rear glass elements being less than about 1.6 mm thick; and a support plate supported by the housing in the cavity, the support plate including a front surface located proximate but spaced rearward of a rear surface of the mirror subassembly to form a thin gap of about 0.3 mm to 1.0 mm deep therebetween, the gap permitting flexure of the mirror subassembly, but the support plate preventing excessive deformation of the mirror subassembly upon impact or localized stress, thus reducing a tendency of the mirror subassembly to fracture.

21. A mirror assembly for a vehicle comprising:

a housing defining a cavity and a front opening;

an electrochromic mirror subassembly supported in the front opening;

a bezel attached to a front edge of the housing around the front opening, and including a flange abutting a front perimeter surface of the mirror subassembly; and a support plate supported by the housing in the cavity, the support plate including a plurality of edge fingers engaging a perimeter edge of the mirror subassembly and biasing the mirror subassembly against the flange of the bezel.

22. The mirror assembly defined in claim 21, wherein the housing is horizontally elongated and constructed for use inside a vehicle passenger compartment.

23. The mirror assembly defined in claim 21, wherein the housing includes a center mounting section configured for attachment to a vehicle front windshield.

24. The mirror assembly defined in claim 21, wherein the electrochromic mirror subassembly includes a flat front mirror element and a flat rear mirror element.

25. The mirror assembly defined in claim 22, wherein the support plate is spaced a short distance from the mirror subassembly.

26. A mirror assembly for a vehicle comprising:

a housing defining a cavity and a front opening;

an electrochromic mirror subassembly supported in the front opening;

a printed circuit board securely supported in the housing in the cavity; and a support plate supported by the housing in the cavity, the support plate including a plurality of fingers engaging the printed circuit board and biasingly holding at least a portion of the printed circuit in compression within the housing.

27. A mirror assembly for a vehicle comprising:

a housing including a back wall;

an electrochromic mirror subassembly;

a support plate supported by the back wall, the support plate including a flat front surface unattached to but positioned closely behind the mirror subassembly in a position where the flat front surface supports the mirror subassembly and prevents excessive flexure of the mirror subassembly on impact, thus reducing a tendency of the mirror subassembly to fracture when non-uniformly stressed;

a printed circuit board including a control circuit operably connected to the electrochromic mirror subassembly, the circuit board being positioned in the cavity between the support plate and the back wall.

* * * * *